(No Model.)
E. S. McCLELLAN.
TRAP.
No. 309,395. Patented Dec. 16, 1884.
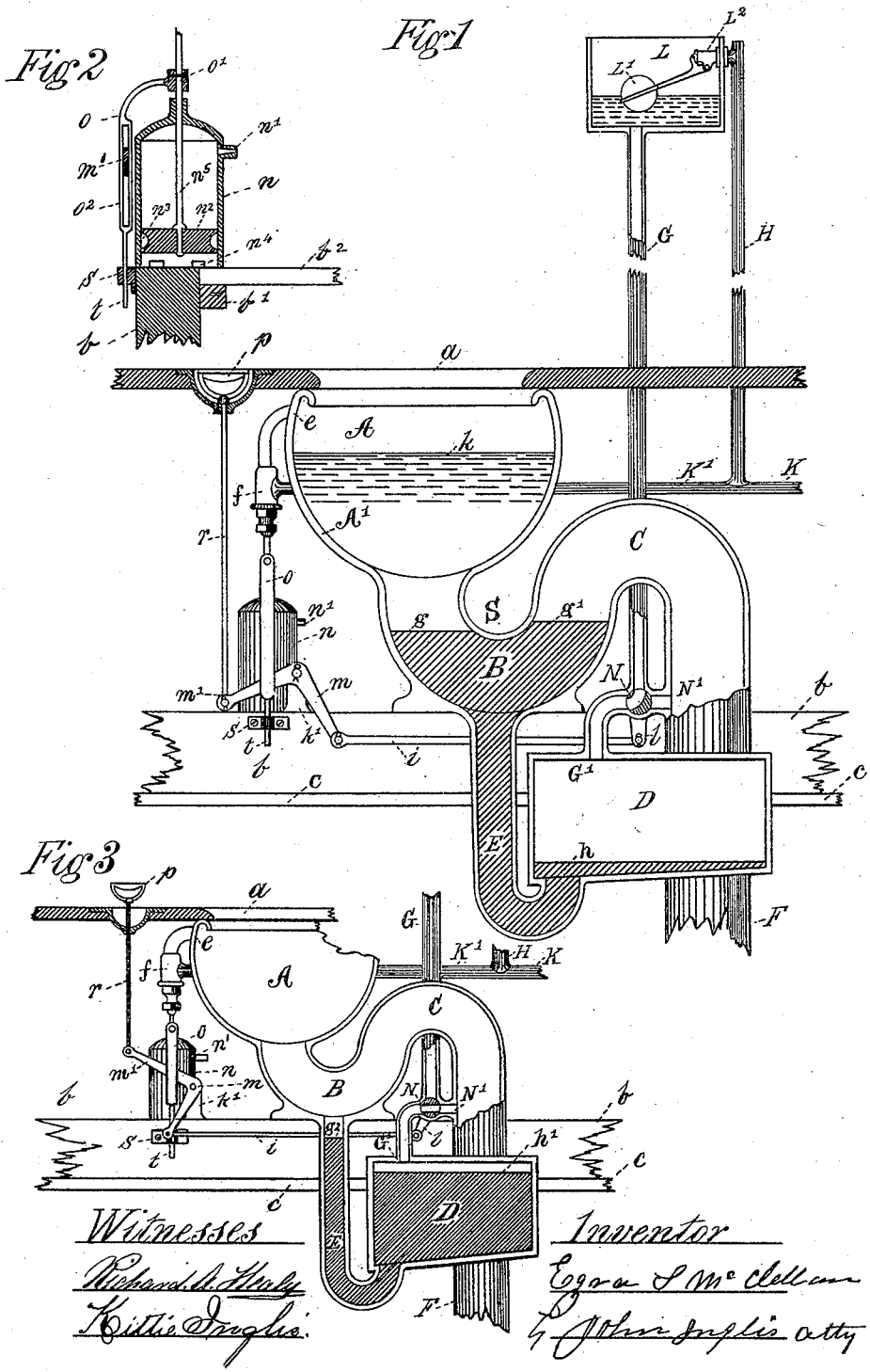
Witnesses
Richard A. Healy
Kittie Inglis
Inventor
Ezra S. McClellan
by John Inglis atty

United States Patent Office.

EZRA S. McCLELLAN, OF PATERSON, NEW JERSEY.

TRAP.

SPECIFICATION forming part of Letters Patent No. 309,395, dated December 16, 1884.

Application filed November 7, 1883. (No model.)

*To all whom it may concern:*

Be it known that I, EZRA S. MCCLELLAN, a citizen of the United States, residing at Paterson, Passaic county, State of New Jersey, have invented a new and useful Improvement in Mercury-Seal Traps, of which the following is a specification, reference being had to the accompanying drawings, forming a part thereof.

The object of my invention is to produce a sanitary trap in which an absolute bar or seal against the poisonous gases and fungoids of sewers and soil-pipes is secured.

The invention consists of various devices, which will be hereinafter fully explained.

Figure 1 of the drawings shows my improved trap in elevation and charged. Fig. 2 is a sectional elevation of air-chambers detached; and Fig. 3 is a part elevation of the trap, the trap being discharged.

A represents a mercury-seal gravity-trap as applied to a water-closet. The trap is constructed with a bowl, A', and with an open and unobstructed passage, B and C, through the same to the soil-pipe, with which it connects. The trap A, which may be made of any suitable material or materials in one or more parts or sections, is arranged on and suitably secured to a timber, $b$, said timber resting on and supported by the floor $c$, as shown in Figs. 1 and 2.

The seat of the closet, which is made in the well-known way, is provided with an opening, $a$, and a dish to accommodate a pull, P, which pull is arranged therein, the seat of the closet being supported in the usual way.

The trap centrally and at the point of its greatest depression is provided with a pipe, E, the lower end of which pipe is curved upward, and connects at its curved end with a square chamber, D, which chamber is suitably secured to and supported by the timber $b$ and floor $c$. There connects in a suitable way with the chamber D, at the top of the same, a pipe, G', and with the pipe G' there connect a pipe, G, and an outlet-pipe, N', at the junction of which pipes there is arranged a valve, N, said valve having a lever, $l$, to the end of which lever there is adjustably connected a link, $i$. The link $i$, that is horizontally arranged, is adjustably secured at its opposite end to the inner arm, $m$, of a crank that is pivoted to a standard, $k'$, which standard is secured to the timber $b$. The outer crank-arm, $m'$, is arranged in a slot formed in the rod $o$, and passes through said slot and connects adjustably with the lower end of a vertically-arranged rod, $r$, which rod is secured at its opposite and upper end to the pull P. The slotted rod $o$ is provided at the bottom with a pin, $t$, which pin is arranged in a guide, which guide is secured to the timber $b$ by screws $s$. The top of the rod $o$ is curved, and is provided with an eye to accommodate a piston-rod, $n^5$, which rod is arranged in the eye formed on the rod $o$, and is secured therein by a pin, $o'$. The piston $n^2$, which is arranged in an air-chamber, $n$, is provided with suitable packing, $n^3$. The bottom $b'$ of the chamber $n$ rests on the timber $b$, and the chamber is provided with air-spaces $n^4$ and $n'$, as shown in Fig. 2.

The pipe G connects with a tank, L, which tank is suitably located above the chamber D, with which it connects by said pipe.

The pipe H, which connects with the tank by a valve, $L^2$, is connected at the bottom with the supply-pipe $k$. A branch, $k'$, of said pipe passes horizontally to an inlet-pipe, $e$, with which it is connected by a valve, $f$, which valve connects with and is operated by the rod $o$. The valve $L^2$ is provided with a float, $L'$, which float is arranged in the tank L.

Operation: The mercury is placed in the passage, which by gravity descends through pipe E and takes its place in the chamber D, as shown in Fig. 3, after which action the pull P is raised, which action, by means of the rod $r$, raises the crank-arm $m'$, which draws in its direction, by means of crank-arm $m$, the link $i$, which link in its action draws inwardly the valve-lever $l$, which closes the passage through the hydrostatic pipe G and inlet G' into the chamber D, which action opens the outlet N'. The pressure of water from the tank L through the pipes G G' forces the mercury out of the chamber D, through the pipe E, up into the passage B and above the bridge S, and thus automatically forming the mercury seal, the mercury standing on a level at $g$ and $g'$. The rod $o$, having been raised in the first action by the crank-arm $m'$, opened the valve $f$ and raised the piston $n^2$ by means of the rod $n^5$, which action caused the water to rush from the supply-pipe $k'$, through the inlet $e$, and the air to enter through the air-spaces $n^4$, into the chamber $n$. The valve $f$ having been opened, and the air-chamber filled with air, in the manner stated, the pull P, on being released, descends by gravity from its support of the rod $o$ by means of the falling of the crank-arm $m'$, which causes the rod $o$ to descend slowly, controlled in part by the piston, which dispels the air out of the chamber $n$ through the air spaces or outlets $n'$ $n^4$, the action of descent being in point of time to close the valve $f$, when the bowl is flushed at $e$ to the level $k$. The bowl A' having been flushed to the level $k$ in the manner above stated, the water in the bowl, by its weight and consequent pressure on the mercury at $g$, causes the mercury to sink at $g$ and rise correspondingly high at $g'$. Should the closing of the valve $f$ be delayed from accident or otherwise, and the inflow of water rise above the level $k$, the increased weight of such surplus water will sink the mercury at $g'$ sufficiently low to form a passage between the bridge $s$ and the mercury for the escape of the surplus water through the trap without a separate overflow or discharge pipe. The discharge of the surplus water, as stated, will be continuous while the valve $f$ remains open; but when the valve has been closed and the surplus water has been discharged, the mercury will return to its former position by gravity, and thus restore the mercury seal on the bridge $s$. The float L', that is arranged in the tank L, controls the inflow of the water into the tank automatically. As the water rises in the tank, the float is raised accordingly, and proportionately closes the valve $L^2$, and vice versa when the water falls in the tank. The trap having been charged in the manner stated, the operating devices occupy the position shown in Fig. 1.

To discharge the trap the pull P is raised, which action, by means of rod $r$, raises the crank-arm $m'$, which in its action draws the crank-arm $m$ outwardly, and with it the link $i$, which link in its outward movement takes with it the lever $l$, and thus changes the communication in the valve N into communication with the chamber D at G' and soil-pipe at N', which allows the water in the chamber D to pass out, and the mercury to descend by gravity from the passage B down through the pipe E, and take its place in the chamber D, the crank-arm $m'$ in the same action having raised the rod $o$, and piston $n^2$ opened the valve $f$, causing the water from the supply-pipe $k'$ to rush into the inlet $e$, and the air to rush in through the inlets $n^4$ and fill the chamber $n$. The water flushing the bowl at $e$, and the mercury having been displaced by gravity from the passage B, the contents of the bowl A' pass out through the open and unobstructed passage B C to the soil-pipe F, and from the pipe F to their destination. At the discharge of the trap in the manner stated the operating devices occupy the positions shown in Fig. 3, after which the pull descends in the manner before stated, which opens the passage through the pipes G G' and permits the water to force the mercury from the chamber D, through the pipe E, up into the passage B, and thus restore the mercury seal, as above stated.

My invention is equally well adapted to lavatories, and bath and laundry tubs, and may be used therefor.

Having described my improved mercury-seal gravity-trap, what I claim, and desire to secure by Letters Patent, is—

1. The combination, with the mercury-trap A, constructed with an open passage, B and C, and provided with mercury, of the pipe E, through which the mercury passes to the chambers, and chamber D, for holding the mercury, substantially as described.

2. In a mercury-trap, the combination of the trap A, having passage B C and pipe E, with chamber D, pipes G G', lock N, and water-tank L, with suitable mechanism for operating lock N, substantially as described.

3. In a mercury-trap, the combination of trap A, having passage B C and pipe E, with chamber D, pipe G', lock N, outlet N', and pipe F, substantially as described.

4. In a mercury-trap, the combination of the trap A, having passage B C and pipe E, with chamber D, pipe $e$, valve $f$, rod $o$, air-chamber $n$, pipe $k'$, and pipe H, with suitable mechanism for operating valve $f$ and piston $n^2$, substantially as described.

EZRA S. McCLELLAN.

Witnesses:
 JOHN INGLIS,
 RICHARD A. HEALY.